US012661978B2

(12) United States Patent
Dengg et al.

(10) Patent No.: US 12,661,978 B2
(45) Date of Patent: Jun. 23, 2026

(54) WHEEL LOADER MACHINE

(71) Applicant: Liebherr-Werk Bischofshofen GmbH, Bischofshofen (AT)

(72) Inventors: Reinhard Dengg, Tamsweg (AT); Gerald Heugenhauser, Goldegg (AT); Hans Knapp, Bischofshofen (AT)

(73) Assignee: Liebherr-Werk Bischofshofen GmbH, Bischofshofen (AT)

( * ) Notice: Subject to any disclaimer, the term of this patent is extended or adjusted under 35 U.S.C. 154(b) by 618 days.

(21) Appl. No.: 18/098,335

(22) Filed: Jan. 18, 2023

(65) Prior Publication Data

US 2023/0241966 A1 Aug. 3, 2023

(30) Foreign Application Priority Data

Feb. 3, 2022 (DE) ...................... 20 2022 100 634.2

(51) Int. Cl.
B60K 15/07 (2006.01)
B60K 15/03 (2006.01)
B60K 15/067 (2006.01)

(52) U.S. Cl.
CPC .... B60K 15/07 (2013.01); B60K 2015/03184 (2013.01); B60K 2015/03315 (2013.01); B60K 2015/0675 (2013.01)

(58) Field of Classification Search
CPC ...................................................... B60K 15/07
See application file for complete search history.

(56) References Cited

U.S. PATENT DOCUMENTS

| | | | | |
|---|---|---|---|---|
| 7,270,209 | B2 * | 9/2007 | Suess | B60K 15/03006 |
| | | | | 224/538 |
| 8,534,403 | B2 * | 9/2013 | Pursifull | B60K 15/07 |
| | | | | 180/69.5 |
| 9,212,466 | B2 * | 12/2015 | Yokota | E02F 9/0808 |
| 9,499,047 | B2 * | 11/2016 | Milton | F17C 13/084 |
| 10,167,612 | B2 * | 1/2019 | Kohzu | E02F 9/18 |
| 11,273,717 | B2 * | 3/2022 | Miyaki | H01M 8/2475 |
| 12,257,891 | B2 * | 3/2025 | Zhang | B60K 15/073 |
| 12,320,095 | B2 * | 6/2025 | Knapp | B60K 15/07 |
| 2010/0078244 | A1 * | 4/2010 | Pursifull | B60K 15/07 |
| | | | | 180/69.5 |
| 2010/0297926 | A1 * | 11/2010 | Shimomura | E02F 9/0833 |
| | | | | 454/141 |
| 2014/0000973 | A1 * | 1/2014 | O'Donnell | E02F 9/18 |
| | | | | 180/9.42 |

(Continued)

FOREIGN PATENT DOCUMENTS

| | | | | |
|---|---|---|---|---|
| DE | 102020134643 | A1 * | 6/2022 | B60K 15/063 |
| EP | 1398201 | A2 | 3/2004 | |

(Continued)

*Primary Examiner* — Kevin Hurley
(74) *Attorney, Agent, or Firm* — Dilworth & Barrese, LLP

(57) ABSTRACT

The present invention relates to a machine, in particular wheel loader, with a cabin for the operator of the machine and with an engine compartment arranged behind the cabin, wherein the machine has a drive, which is operable using hydrogen or using energy obtained from hydrogen and wherein one or more tanks are present for receiving hydrogen, wherein the tank or tanks is/are arranged between the cabin and the rear of the machine in a hydrogen fuel system.

20 Claims, 3 Drawing Sheets

(56)     References Cited

U.S. PATENT DOCUMENTS

| | | | | |
|---|---|---|---|---|
| 2014/0069972 A1* | 3/2014 | Willemsen | B60K 15/063 | |
| | | | | 224/401 |
| 2015/0123393 A1* | 5/2015 | Jackson | B60K 15/07 | |
| | | | | 280/834 |
| 2016/0226086 A1* | 8/2016 | Adler | F17C 13/12 | |
| 2024/0328112 A1* | 10/2024 | Dengg | E02F 9/0883 | |
| 2024/0424891 A1* | 12/2024 | Mittal | B60K 15/07 | |
| 2024/0424892 A1* | 12/2024 | Schleifer | B60K 15/07 | |
| 2025/0100374 A1* | 3/2025 | Van Der Knaap | | |
| | | | B60K 15/03006 | |
| 2025/0122059 A1* | 4/2025 | Merten | B66F 9/07518 | |
| 2025/0214455 A1* | 7/2025 | Leesman | B60L 50/71 | |

FOREIGN PATENT DOCUMENTS

| | | | |
|---|---|---|---|
| EP | 2581249 | A1 | 4/2013 |
| EP | 4026723 | A1 | 7/2022 |
| WO | 2021/075970 | A1 | 4/2021 |
| WO | 2022/022855 | A1 | 2/2022 |
| WO | 2022/111795 | A1 | 6/2022 |

* cited by examiner

WHEEL LOADER MACHINE

BACKGROUND OF THE INVENTION

The present invention relates to a machine, in particular a wheel loader, with a cabin for the operator of the machine and with an engine compartment arranged behind the cabin.

It is known from the prior art to implement wheel loaders with a cabin for the operator of the machine and with an engine compartment, wherein a diesel engine, which is used to propel the machine, is located in the engine compartment.

In the course of decarbonization, the question of alternative energy sources, such as hydrogen, for example, is being posed in the field of machines also. Its use has not become established in the case of either private or commercial vehicles.

SUMMARY OF THE INVENTION

The object of the present invention is to develop a machine of the type stated at the beginning to the effect that this is particularly suitable for the use of alternative energy sources, in particular hydrogen.

This object is achieved by a machine with the features herein. According to this, it is provided that the machine has a drive, which can be operated directly or indirectly using hydrogen, and that one or more tanks is/are present to receive hydrogen, wherein the tank or tanks are arranged between the cabin and the rear of the machine in a hydrogen fuel system. This drive is or comprises preferably a drive, which is used to propel the machine, i.e., a travel drive.

This arrangement of the hydrogen tank or tanks in the hydrogen fuel system permits the optimum utilization of the installation space while completely or largely retaining the external vehicle dimensions of a wheel loader or another machine with a diesel engine.

Other advantages consist in the fact that a comparatively low center of gravity is achieved, that positioning preferably in the center of the machine is possible or exists in order to reduce the risk of impact and that a spatial separation of the tank or tanks from hot and flammable ambient conditions in the engine compartment is achieved.

Another advantage of this arrangement consists in the good accessibility of the hydrogen fuel system for maintenance and/or repair work as well as in the possibility of protecting this adequately against damage.

The tank or tanks are preferably part of a tank system, which apart from the tanks comprises pipes and/or valves etc. for carrying and controlling the hydrogen.

The arrangement of the hydrogen fuel system behind the cabin is potentially disadvantageous in itself as far as the field of vision of the machine operator to the rear can be restricted. This problem can be remedied on the one hand by the use of cameras and/or sensors to record the region not visible to the machine operator.

The tank or tanks are preferably located in a region between the cabin and the rear engine compartment of the machine. This arrangement is advantageous on the one hand for concentrating the center of gravity in the center of the machine and on the other hand advantageous as far as high security standards are met in the event of a hydrogen leak, as in a preferred configuration of the invention no components that could lead to ignition of the air-hydrogen mixture are located above the tank system.

This permits a comparatively large quantity of hydrogen to be carried on the unit and nevertheless permits unrestricted compliance with the applicable guidelines and standards in respect of tank installation and safety of the hydrogen tank system. Moreover, the containers can be arranged concentrated at one installation location in a clear and service-friendly manner.

The hydrogen can be stored in any way. For example, the tank can be suitable for storing hydrogen in a liquid and/or gaseous form and/or in combined form.

The hydrogen fuel system is already protected by its elevated position on the engine compartment or on its cover. It is particularly advantageous if a cladding is also present that completely or partially encloses the hydrogen fuel system.

It is preferable if no other part of the machine is located above the hydrogen fuel system. This has the considerable advantage that hydrogen can escape unobstructed upwards in the event of a leak and does not come into contact with a component of the machine. The probability of ignition of escaping hydrogen due to a machine component that may be hot is minimized thereby.

The realization of the tank arrangement described hereby makes it possible to carry a relatively large quantity of hydrogen on the unit and the relevant guidelines and standards in respect of tank installation and safety of the hydrogen system can be adhered to precisely with this tank arrangement. Only thus can a maximum possible period of use of the machine be guaranteed also without refueling.

The concept of a "drive that can be operated using hydrogen" is not to be understood restrictively to the effect that a hydrogen combustion engine is meant, even if this is also comprised by the invention. It is conceivable, for example, that the machine has a fuel cell for generating electric energy by means of hydrogen and/or has a hydrogen combustion engine, that the drive is thus operated indirectly by means of hydrogen.

The propulsion of the machine is preferably facilitated by hydrogen. A drive comprising a fuel cell system and an electrified drive train is conceivable, preferably as a replacement for the diesel engine used in known machines.

It is conceivable that the machine has no combustion engine for diesel fuel or petrol as a travel drive of the machine.

Also comprised by the invention is the case that the machine has a combustion engine for diesel fuel or petrol as a travel drive of the machine and has in addition a drive operable using hydrogen as a travel drive of the machine (dual fuel system).

For the purpose of maintenance and/or exchange it can be provided that the components of the hydrogen fuel system are not fixedly connected to the machine, but are exchangeable.

The hydrogen fuel system and if applicable its cladding are preferably dimensioned such that this does not project laterally and/or backwards and/or forwards beyond the engine compartment.

The number, arrangement and shape of the tanks is arbitrary. It is conceivable to use oblong tanks which are arranged longitudinally or transversely to the direction of travel of the machine.

In respect of the number and positioning of the tanks, such as e.g. longitudinally and/or transversely to the direction of travel, upright or horizontally, all implementations are comprised by the invention.

The tank arrangement is preferably located not above the engine compartment but ahead of this in the direction of travel.

The tank system is preferably enclosed by a solid cladding in order to protect the containers from mechanical influences, for example during an accident.

In another configuration of the invention, a protective cladding, e.g. of solid steel plate, is provided, which in the event of rollover (partly) prevents the cabin from being pushed in and the operator from being trapped in the cabin.

It is conceivable that the tank system can separate completely or partially from the vehicle frame at a predefined predetermined breaking point in the event of a serious accident.

It is conceivable, furthermore, for a mounting frame to be present that partially or completely encloses the hydrogen container or containers and/or the valve technology, wherein the mounting frame can deform in the event of an accident and can thus absorb a portion of the energy arising.

Furthermore, one or more safety measures, e.g. in the form of a detection and control mechanism, can be provided, which secure an uncontrolled escape of hydrogen, for example in the case of one or more damaged hydrogen pipes. These can be valves, for example, which close when the escape of hydrogen is detected. The closure and the initiation of safety measures preferably takes place automatically, i.e. without the intervention of the machine operator. A safety concept can thus be realized which, in the case of an uncontrolled hydrogen escape due to one or more damaged components, ensures that the tank valves are closed.

The machine can also have a rear-side way up on one or both sides of the vehicle or at the rear for servicing or maintenance work or for access or climbing up to the cabin.

The hydrogen fuel system (also termed "tank system" in the context of the invention) can comprise one or more of the components:

tank for receiving hydrogen or containing hydrogen,
valve,
pipework or consist of these. Said pipework is used, for example, to connect the tank or tanks to one or more valves and/or to link a supply line leading to the drive and/or to connect tanks to one another etc.

The present invention comprises both a machine with tanks partly or completely filled with hydrogen and a machine with tanks that are not filled with hydrogen.

In another configuration of the invention, it is provided that the machine has a base frame and that the tank or a tank system comprising this is designed and arranged such that in the event of an accident in particular, a portion of the forces arising is dissipated via the tank or tanks and/or via a tank system comprising the tank or tanks to the base frame. In the event of the vehicle tipping or turning over, enormous forces arise. So that the tank system withstands these without safety-relevant components incurring damage, an extremely solid supporting structure is usually required. This increases the vehicle weight substantially, however, and due to the higher center of gravity has negative effects on the driving properties of the machine. In the optional implementation described here, this problem can be solved by using the mechanical strength of the tank or tanks or of the tank system and thereby dissipating at least a portion of the forces arising via the structure of the tank or tanks or of the tank system or systems to the supporting basic framework of the vehicle.

It is preferable that the tanks, if these consist of composites (for example, carbon fiber composites or glass fiber composites), are fastened in their frame in daily operation such that only extremely small forces act on the tank structure. If the tanks were fastened rigidly in their frame, this would possibly result, in connection with the expansion during the filling process, in serious damage and thus an absolutely necessary exchange of the tanks.

In another preferred configuration of the invention, it is provided that components with little mechanical strength and/or highly sensitive components in safety terms such as e.g. tank valves are enclosed by a structure protecting against mechanical influences. This protective structure is preferably much smaller and lighter than protective armor that encloses the complete tank system.

Reference is made at this point to the fact that the designations "a" and "one" do not necessarily refer to precisely one of the elements, even if this represents a possible implementation, but rather can also describe a plurality of the elements. Likewise, the use of the plural also includes the presence of the element in question in the singular and conversely the singular also comprises a number of the elements in question.

BRIEF DESCRIPTION OF THE DRAWINGS

Further details and advantages of the invention are explained in greater detail on the basis of an exemplary embodiment depicted in the drawing.

There is shown.

DESCRIPTION OF THE PREFERRED EMBODIMENTS

Figure 1:
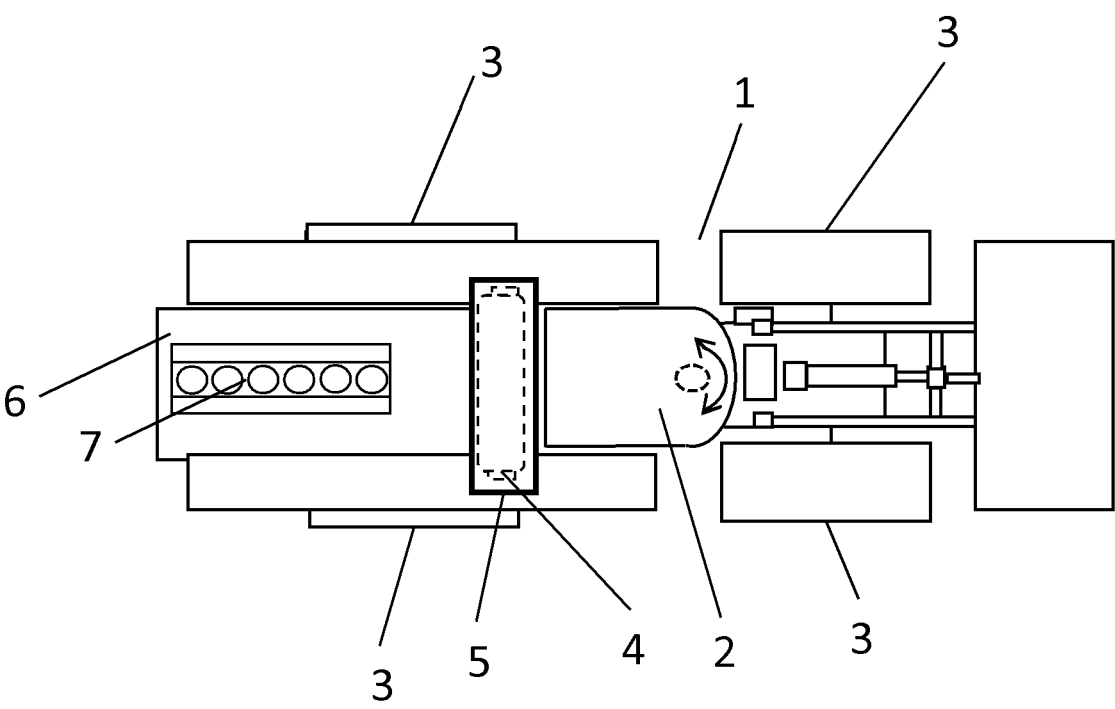
FIG. 1: a schematic plan view of the wheel loader.

FIG. 1 shows a plan view of the wheel loader 1 according to the invention. The wheel loader 1 has a front section and a rear section, which are connected to one another by an articulated joint. The double arrow around the articulated joint, which is depicted by a dashed line, clarifies the mobility of the front and rear section relative to one another.

The cabin for the operator of the wheel loader is identified by 2. The cabin is arranged on the rear section. Located directly behind the cabin 2 is a tank 4 arranged transversely to the direction of travel, which tank is enclosed preferably on all sides by a protective structure, likewise arranged transversely to the direction of travel, and by a mounting frame 5.

In the exemplary embodiment depicted, the tank 4 and the mounting frame 5 extend on both sides beyond the cabin 2.

Figure 2:
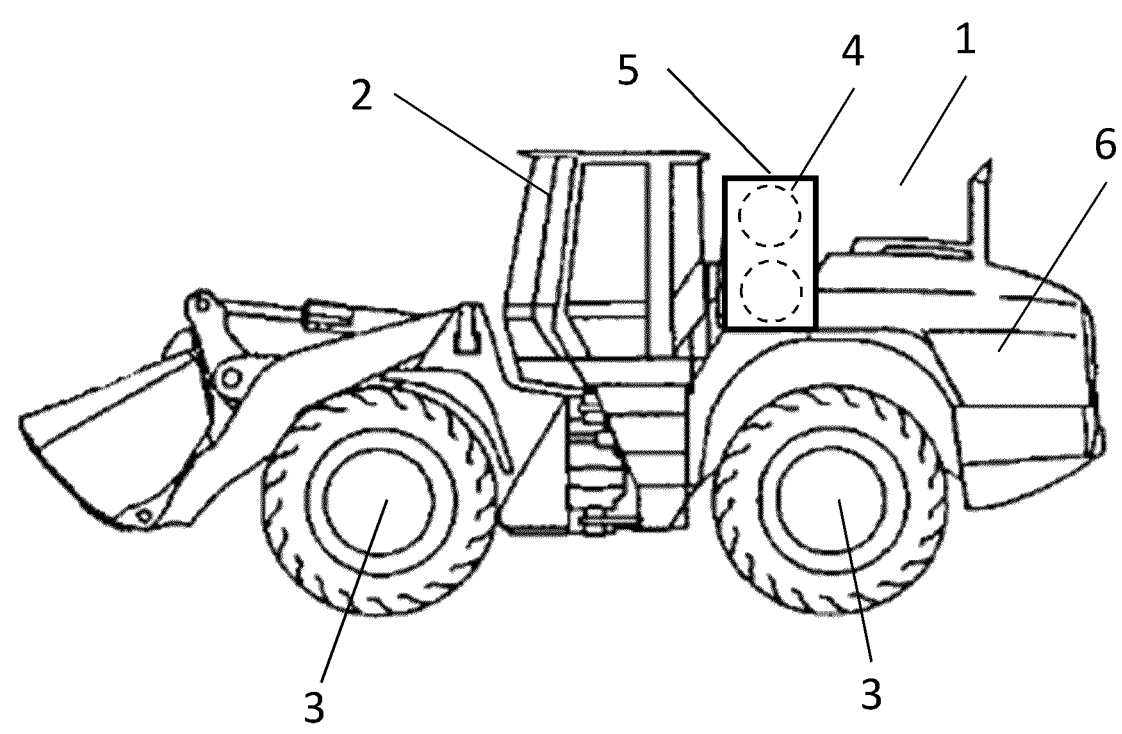
FIG. 2: a schematic side view of a wheel loader from the left.
Figure 3:
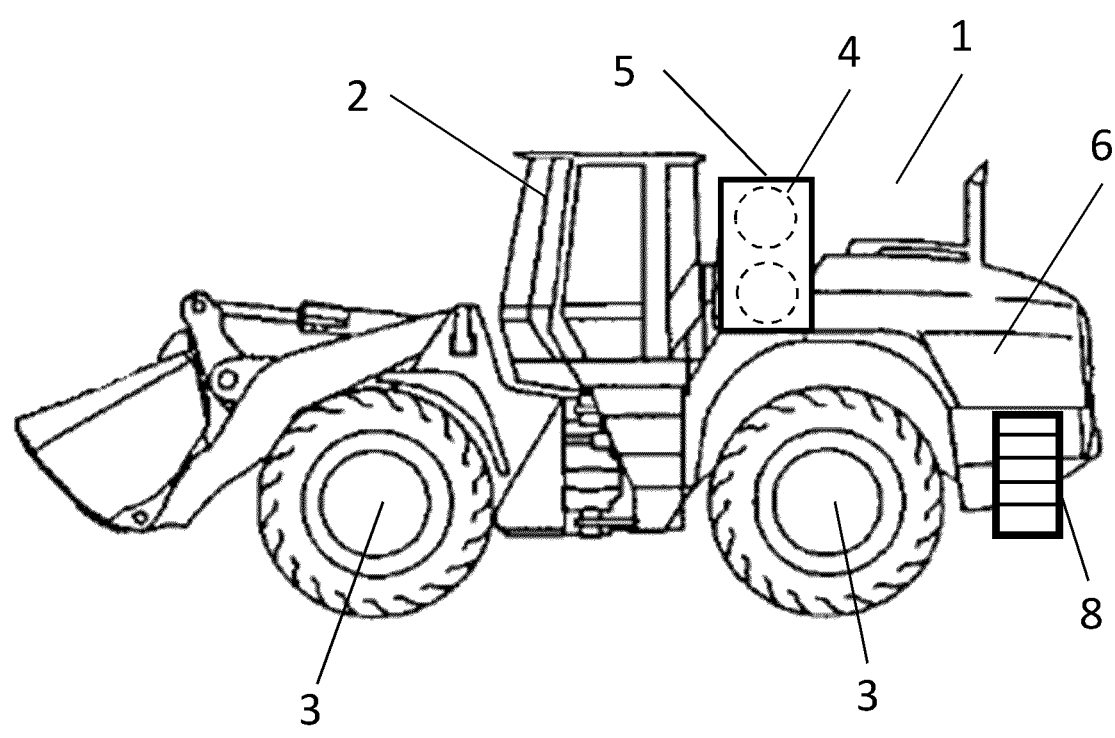
FIG. 3: a schematic side view of a wheel loader from the left with rear-side way up.

As is clear from the side views of FIGS. 2 and 3, the tank system extends substantially up to the cabin roof. It can have one, two or more than two tanks arranged above one another and/or adjacent to one another.

Located in the rear section of the wheel loader is the engine compartment 6, which has among other things the drive technology of the wheel loader for driving the wheels 3 of the wheel loader 1. The drive can be a hydrogen combustion engine, for example, or also a fuel cell, which provides an electric motor with electric energy.

The reference character 8 identifies the maintenance and service access to the engine compartment 6, which access is preferably formed as a ladder or steps, as is evident from FIG. 3.

FIG. 2 shows the wheel loader according to FIG. 1 in a side view from the left and FIG. 3 shows the wheel loader according to FIG. 1 in a side view from the left with optional, rear access.

It is evident from both figures that the tank or tank arrangement is located directly behind the cabin 2. Located between the cabin 2 and the engine compartment 6 is a recess in which the tank assembly is arranged.

The invention claimed is:

1. Machine, in particular wheel loader, with a cabin for an operator of the machine and with an engine compartment arranged behind the cabin, wherein
the machine comprises a drive, which is operable using hydrogen or with energy obtained from hydrogen,
one or more tanks are present to receive hydrogen, and
the tank or tanks is/are arranged between the cabin and the rear of the machine in a hydrogen fuel system, wherein the one or more tanks are arranged between the cabin and the engine compartment.

2. Machine according to claim 1, wherein the tank is arranged directly behind the cabin.

3. Machine according to claim 1, wherein the tank is not arranged above the engine compartment.

4. Machine according to claim 1, wherein behind the cabin is a recess in which the tank is located.

5. Machine according to claim 1, wherein the hydrogen fuel system is suitable for storing hydrogen in liquid and/or gaseous form and/or combined form.

6. Machine according to claim 1, wherein a structure protecting against mechanical influences is present, which encloses the hydrogen fuel system at least partially.

7. Machine according to claim 1, wherein a cladding is present, which encloses the hydrogen fuel system at least partially.

8. Machine according to claim 1, wherein no other component of the machine that can constitute an ignition source is located above the hydrogen fuel system.

9. Machine according to claim 1, wherein the machine has a fuel cell for producing electric energy by hydrogen and/or hydrogen combustion engine.

10. Machine according to claim 1, wherein the machine has no combustion engine for diesel fuel or petrol to drive the machine or apart from the drive operable using hydrogen, the machine has a combustion engine for diesel fuel or petrol to drive the machine.

11. Machine according to claim 1, wherein the components of the hydrogen fuel system are not connected fixedly to the machine but are exchangeable.

12. Machine according to claim 1, wherein the hydrogen fuel system at least partially forms a pre-assembly module.

13. Machine according to claim 1, wherein the hydrogen fuel system comprises one or more of the following components: a tank for receiving hydrogen or containing hydrogen, a valve, and pipework.

14. Machine, in particular wheel loader, with a cabin for an operator of the machine and with an engine compartment arranged behind the cabin, wherein
the machine comprises a drive, which is operable using hydrogen or with energy obtained from hydrogen,
one or more tanks are present to receive hydrogen, and
the tank or tanks is/are arranged between the cabin and the rear of the machine in a hydrogen fuel system, wherein a predetermined break point is present, which is designed and arranged such that, upon the impact of force, in particular in the event of an accident, the tank and/or a tank system comprising the container or containers becomes detached from the machine and in particular from its vehicle frame, or moves relative thereto, at the predetermined break point.

15. Machine according to claim 1, wherein a tank system comprising the container or containers has a mounting frame, which is designed to deform in the event of an impact of force, in particular in the event of an accident.

16. Machine according to claim 1, wherein the machine has a rear-side way up.

17. Machine according to claim 1, wherein the machine has a base frame and in particular in the event of an accident, a portion of the forces arising is dissipated via the tank or tanks and/or via a tank system comprising the tank or tanks to the base frame.

18. Machine according to claim 1, wherein components with little mechanical strength are enclosed by a structure protecting against mechanical influences.

19. Machine, in particular wheel loader, with a cabin for an operator of the machine and with an engine compartment arranged behind the cabin, wherein
the machine comprises a drive, which is operable using hydrogen or with energy obtained from hydrogen,
one or more tanks are present to receive hydrogen, and
the tank or tanks is/are arranged between the cabin and the rear of the machine in a hydrogen fuel system, wherein a safety mechanism is present, which is designed to ensure in the event of an uncontrolled escape of hydrogen due to one or more damaged components, the valve or valves of the tank or tanks is/are closed.

20. Machine according to claim 2, wherein the tank is not arranged above the engine compartment.

* * * * *